(12) United States Patent
Lee et al.

(10) Patent No.: US 10,063,046 B2
(45) Date of Patent: Aug. 28, 2018

(54) DIRECT CURRENT CIRCUIT BREAKER AND METHOD USING THE SAME

(71) Applicant: LSIS CO., LTD., Gyeonggi-do (KR)

(72) Inventors: Gyeong-Ho Lee, Gyeonggi-do (KR); Jung-Wook Sim, Gyeonggi-do (KR); Chae-Yoon Bae, Gyeonggi-do (KR); Hae-Yong Park, Gyeonggi-do (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 271 days.

(21) Appl. No.: 15/142,201

(22) Filed: Apr. 29, 2016

(65) Prior Publication Data

US 2016/0336734 A1     Nov. 17, 2016

(30) Foreign Application Priority Data

May 13, 2015 (KR) .................. 10-2015-0066751

(51) Int. Cl.
*H02H 3/00* (2006.01)
*H02H 3/20* (2006.01)
(Continued)

(52) U.S. Cl.
CPC .............. *H02H 3/202* (2013.01); *H01H 9/54* (2013.01); *H01H 33/596* (2013.01); *H02H 3/02* (2013.01); *H02H 3/087* (2013.01); *H02H 3/021* (2013.01)

(58) Field of Classification Search
CPC ...................................................... H02H 3/202
See application file for complete search history.

(56) References Cited

U.S. PATENT DOCUMENTS 3,753,042 A    8/1973 Kind et al.
4,550,356 A *  10/1985 Takahashi ............ H01H 33/161
                                                        361/11
(Continued)

FOREIGN PATENT DOCUMENTS

CN    102780200 A    11/2012
CN    103441489 A    12/2013
(Continued)

OTHER PUBLICATIONS

Japanese Office Action dated Jul. 25, 2017 in connection with the counterpart Japanese Patent Application No. 2016-095097.
(Continued)

*Primary Examiner* — Stephen W Jackson
(74) *Attorney, Agent, or Firm* — K&L Gates LLP

(57) ABSTRACT

Some embodiments of the present disclosure relate to a direct current circuit breaker capable of shortening a cut-off operation time and reducing a magnitude of a required reverse current. The direct current circuit breaker includes: a main circuit line which is connected between a power supply and a load, the main circuit line includes a main breaker and a first diode connected in parallel; a charging circuit line which is disposed in the rear stage of the main breaker and is connected in parallel to the load, the charging circuit line includes a first capacitor, a reactor and a second diode connected in series; and a switch line including one end connected in parallel to the front stage of the main breaker and the other end connected between the reactor and the second diode, the switch line includes a third diode and a current switch connected in series.

8 Claims, 6 Drawing Sheets

(51) Int. Cl.
   *H02H 3/02* (2006.01)
   *H01H 9/54* (2006.01)
   *H01H 33/59* (2006.01)
   *H02H 3/087* (2006.01)

(56) References Cited

U.S. PATENT DOCUMENTS

| | | | |
|---|---|---|---|
| 4,578,730 A * | 3/1986 | Tokuyama | H01H 33/596 307/126 |
| 4,618,905 A | 10/1986 | Tokuyama et al. | |
| 2014/0233140 A1 | 8/2014 | Gaxiola et al. | |

FOREIGN PATENT DOCUMENTS

| | | |
|---|---|---|
| JP | 61-13517 A | 1/1986 |
| JP | 2005222705 A | 8/2005 |
| JP | 2006032077 A | 2/2006 |
| JP | 2010238391 A | 10/2010 |
| JP | 2011175925 A | 9/2011 |
| JP | 2013196895 A | 9/2013 |
| JP | 2015115096 A | 6/2015 |
| KR | 101522412 B1 | 5/2015 |
| KR | 20150075944 | 7/2015 |
| WO | 2013045238 A1 | 9/2012 |
| WO | 2013045238 A1 | 4/2013 |
| WO | 2013/164874 A1 | 11/2013 |
| WO | 2013164874 A1 | 11/2013 |
| WO | 2014/166528 A1 | 10/2014 |
| WO | 2014166528 A1 | 10/2014 |
| WO | 2015/011949 A1 | 1/2015 |

OTHER PUBLICATIONS

European Search Report dated Sep. 26, 2016 issued in corresponding European Application No. 16 16 6743.

Chinese Office Action for related Chinese Application No. 201610306124.1; action dated Feb. 24, 2018; (6 pages).

* cited by examiner

DIRECT CURRENT CIRCUIT BREAKER AND METHOD USING THE SAME

CROSS-REFERENCE TO RELATED APPLICATIONS

This application claims the benefit of Korean Patent Application No. 10-2015-0066751 filed on May 13, 2015, in the Korean Intellectual Property Office, the disclosure of which is incorporated herein by reference.

BACKGROUND

Technical Field

The present disclosure relates to a direct current circuit breaker and more particularly, to a direct current circuit breaker which is capable of shortening a cut-off operation time and reducing a magnitude of a required reverse current.

Description of the Related Art

In general, a direct current circuit breaker is a device used to cut off a system quickly and efficiently for repair and replacement of a device on a HVDC (High Voltage Direct Current) transmission line or distribution line and protection of a device or system at the time of occurrence of a fault current.

FIG. 1 shows a conventional direct current circuit breaker (e.g., see WO2013/045238 A1 (PCT/EP2012/067276)). Referring to FIG. 1, a conventional direct current circuit breaker 100 includes a main electric conducting part consisting of mechanical breakers 110 and 120 and a diode 124 which are responsible for electric conduction of a rated current, a resistor 150, an inductor 160, a capacitor 170 and a surge arrestor 180. In addition, the conventional direct current circuit breaker 100 further includes a pulse generator (PG) 185 which consists of a thyristor 190 and a diode 195 and produces a reverse current for arc extinguishment at the time of current cut-off and a part which consists of a diode 130 and a surge arrestor 140 and absorbs and cancels energy remaining in a line.

An operation of the conventional direct current circuit breaker 100 is as follows. At the time of conduction of the rated current, the mechanical breaker 120 is closed to flow the rated current. At this time, due to a potential difference between a fourth node 104 and a second node 102, the capacitor 170 is charged through a path of the diode 195 of the PG 185→the resistor 150→the capacitor 170. When the capacitor is fully charged, the potential difference between the fourth node 104 and the second node 102 disappears and a flow of current into the PG 185 is cut off. Thus, the direct current circuit breaker 100 is completed to be ready to operate.

When a fault current occurs and the direct current breaker 100 begins to perform its cut-off operation, the mechanical breakers 110 and 120 are first opened. However, the mechanical breakers 110 and 120 are in a state where the fault current continues to flow due to an arc current. Thereafter, the thyristor 190 of the PG 185 is turned on to reversely charge the capacitor 170 through a path of the capacitor 170→the inductor 160→the thyristor 190. When the amount of reverse charging of the capacitor 170 reaches a discharging voltage of the surge arrestor 140, the surge arrestor 140 is brought into an electrical conduction state. Then, the capacitor 170 begins to be discharged and, accordingly, a reverse current flows into the mechanical breaker 120 through a path of the capacitor 170→the surge arrestor 140→the diode 130→the mechanical breaker 120→the diode 195→the resistor 150. Accordingly, the fault current flowing into the mechanical breaker 120 meets the reverse current, thereby producing a current zero point. As a result, an arc of the mechanical breaker 120 is extinguished. A reverse current remaining after the arc extinguishment flows through the diode 125. In addition, energy remaining in a line after completion of the cut-off of the mechanical breaker 120 is absorbed through the surge arrestors 140 and 180 and the capacitor 170 of the PG 185 is recharged to prepare for a next cut-off operation.

However, in the above-described conventional direct current circuit breaker 100, the capacitor 170 of the PG 185 has to be reversely charged in order to create the reverse current at the time of the cut-off operation. Such a process may result in a delay of the cut-off operation. Further, since the fault current increases fast, a larger fault current increased as much as delayed time has to be cut off. This may impose a big burden on the capacitor 170, the mechanical breaker 120 and the surge arrestor 140, requiring parts including a higher capacity, which may result in increase in production costs of direct current circuit breakers.

SUMMARY

Accordingly, it is an object of some embodiments of the present disclosure to provide a direct current circuit breaker which is capable of shortening a cut-off operation time and reducing a magnitude of a required reverse current.

To accomplish the above object, there is provided a direct current circuit breaker which uses a charged capacitor to produce a reverse current to cut off a fault current, including: a main circuit line which is connected between a power supply and a load, wherein the main circuit line includes a main breaker and a first diode connected in parallel; a charging circuit line which is disposed in the rear stage of the main breaker and is connected in parallel to the load, wherein the charging circuit line includes a first capacitor, a reactor and a second diode connected in series; and a switch line including one end connected in parallel to the front stage of the main breaker and the other end connected between the reactor and the second diode, wherein the switch line includes a third diode and a current switch connected in series.

The main circuit line may further include an auxiliary breaker and a current limiting reactor connected in series.

The charging circuit line may further include a second capacitor.

The direct current circuit breaker may further include a first resistor and a second resistor connected in parallel to the first capacitor and the second capacitor, respectively, wherein the first resistor and the second resistor are used to control charging capacities of the first capacitor and the second capacitor.

The main breaker may be a mechanical switch or a high-speed switch.

The current switch may be a mechanical switch or a power semiconductor switch.

The direct current circuit breaker may further include a circuit connected in parallel to the front stage of the first capacitor and the rear stage of the reactor, wherein the circuit includes a fourth diode and a first nonlinear resistor connected in series.

A second nonlinear resistor may be connected in parallel to the second capacitor.

A second main breaker, a fifth diode, a sixth diode and a second current breaker may be disposed in symmetry to the main breaker, the first diode, the third diode and the current switch, respectively, with respect to the charging circuit line.

With the direct current circuit breakers according to embodiments of the present disclosure, since the first capacitor is already charged in the steady state, it is possible to immediately produce a reverse current at the time of cut-off operation. This makes it possible to shorten a time taken for the cut-off operation and cut off a circuit to cope with a smaller fault current. Accordingly, it is possible to employ a small capacity mechanical breaker and capacitor with low cut-off performance required, which can result in reduction of production costs.

DETAILED DESCRIPTION

Figure 1:
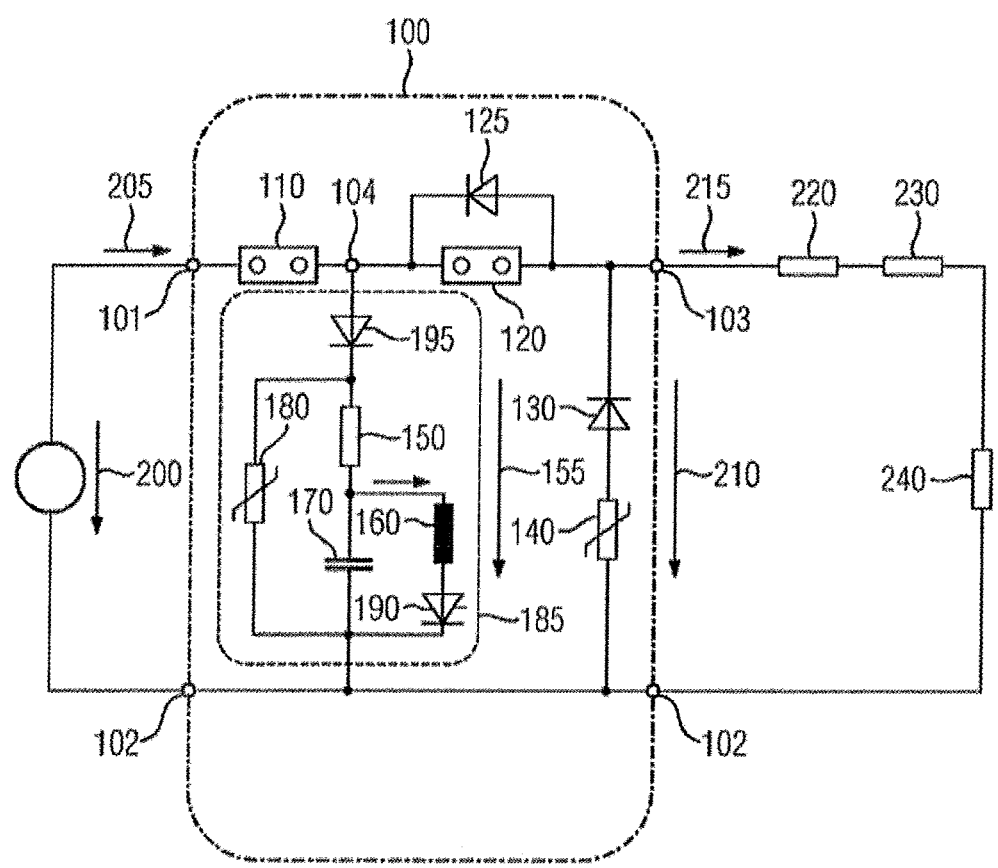
FIG. 1 is a circuit diagram of a conventional direct current circuit breaker.

The above objects, features and advantages will become more clearly apparent from the following detailed description in conjunction with the accompanying drawings. Therefore, the technical ideas of the present disclosure can be easily understood and practiced by those skilled in the art. In the following detailed description of the present disclosure, concrete description on related functions or constructions will be omitted if it is deemed that the functions and/or constructions may unnecessarily obscure the gist of the present disclosure. Hereinafter, preferred embodiments of the present disclosure will be described in detail with reference to the accompanying drawings. Throughout the drawings, the same or similar elements are denoted by the same reference numerals.

In the specification, the terms 'front stage' and 'rear stage' of an element are based on a direction of flow of a current in a steady state. For example, if a breaker is interposed between an anode and a cathode of a power supply, a current flows along a path of the power supply anode→the breaker front stage→the breaker→the breaker raer stage→the power supply cathode.

Figure 2:
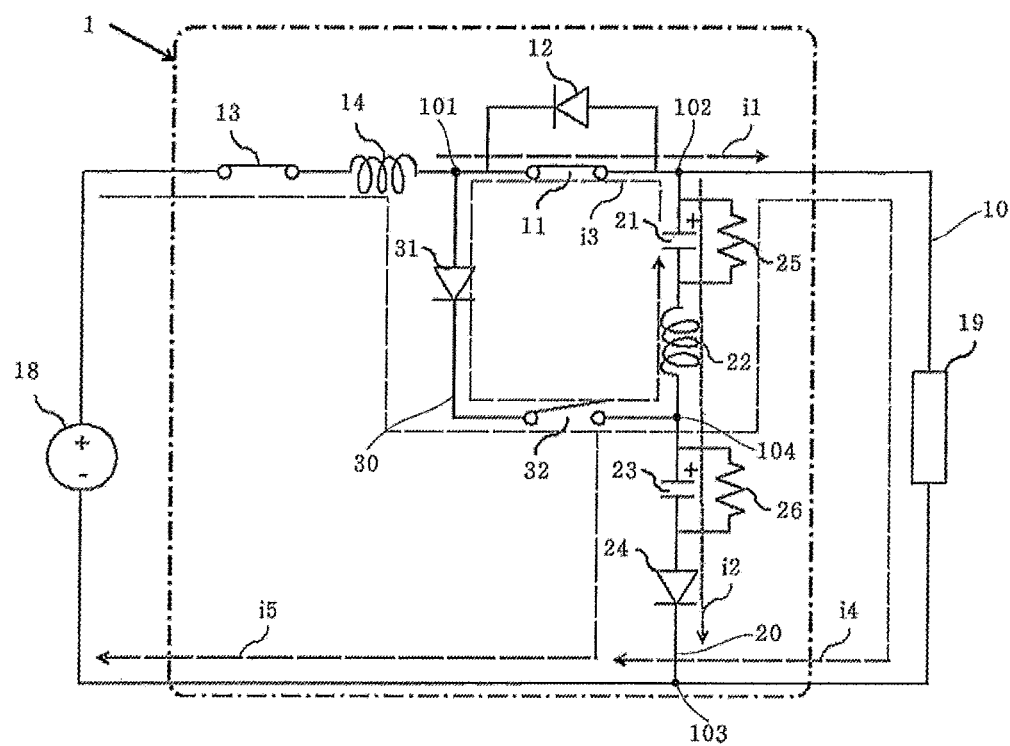
FIG. 2 is a circuit diagram of a direct current circuit breaker according to one embodiment of the present disclosure.
Figure 3:
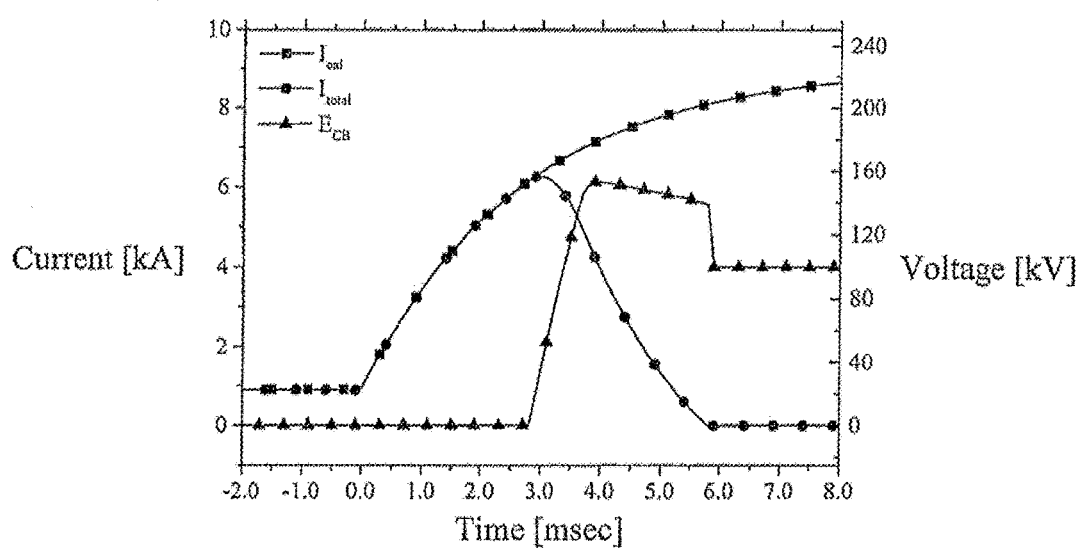
FIG. 3 is a view showing voltage and current waveforms at the time of cut-off of a fault current in the direct current circuit breaker according to one embodiment of the present disclosure.
Figure 4:
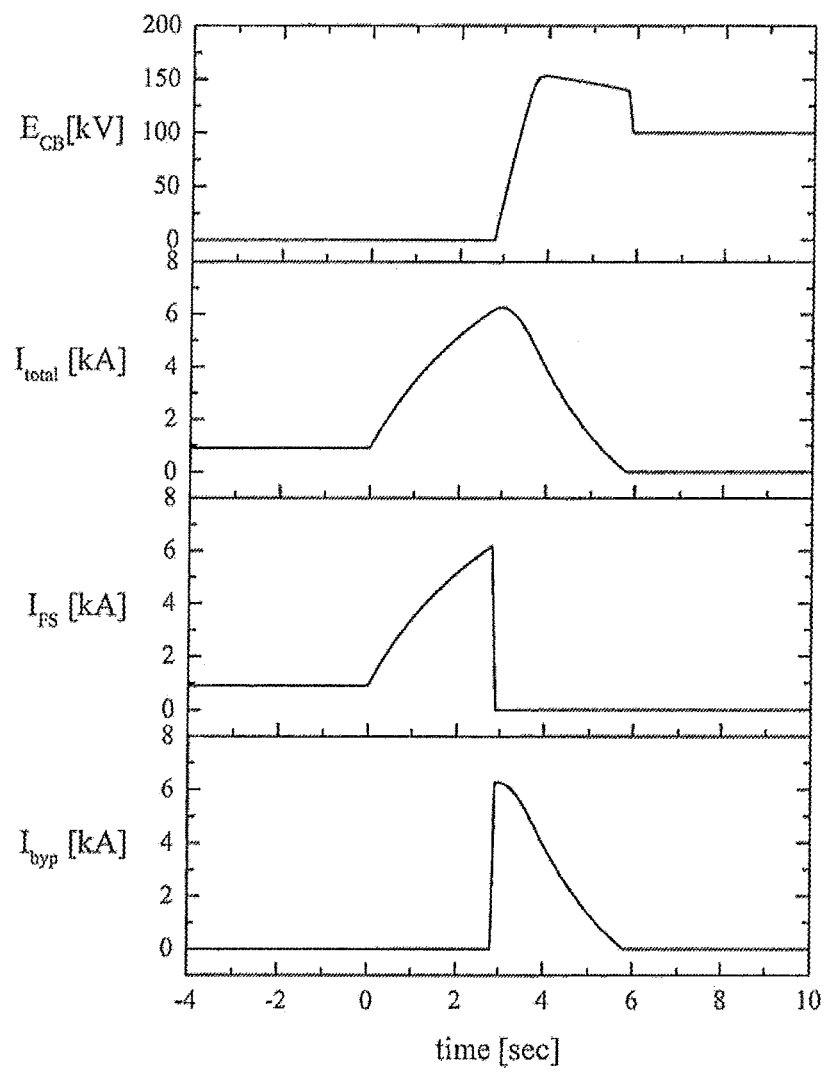
FIG. 4 is a view showing the voltage and current waveforms of FIG. 3 individually.

FIG. 2 is a circuit diagram of a direct current circuit breaker according to one embodiment of the present disclosure. FIG. 3 is a view showing voltage and current waveforms at the time of cut-off of a fault current in the direct current circuit breaker according to one embodiment of the present disclosure. FIG. 4 is a view showing the voltage and current waveforms of FIG. 3 individually. Hereinafter, direct current circuit breakers according to some embodiments of the present disclosure will be described in detail with reference to the drawings.

Referring to FIG. 2, a direct current circuit breaker 1 according to one embodiment of the present disclosure is connected between a power supply 18 and a load 19. The direct current circuit breaker 1 includes a main circuit line 10 including a main breaker 11 and a first diode 12 connected in parallel; and a charging circuit line 20 disposed in the rear stage of the main breaker 11, which is connected in parallel to the load 19 and includes a first capacitor 21, a reactor or inductor 22 and a second diode 24 connected in series.

The main circuit line 10 is circularly connected between the power supply 18 and the load 19. A current *flows from an anode (+pole) of the power supply 18 to a cathode (−pole) of the power supply 18 via the load 19.

The main breaker 11 disposed on the main circuit line 10 is responsible for electrical conduction and cut-off of a rated current. In this embodiment, the main breaker 11 may be configured with a typical mechanical switch or a high-speed switch. Such a configuration of the main breaker 11 may be optional according to a rated voltage. In this case, the high-speed switch may be one or more of a plurality of mechanical switches with small contact resistance connected in series according to a rated voltage. In addition, the main breaker 11 may employ a breaker which is typically used in an alternating current (AC) system.

The first diode 12 is disposed in parallel to the main breaker 11. In this embodiment, the first diode 12 is disposed to allow a current to flow from the load 19 to the anode of the power supply 18. The first diode 12 also provides a passage of a remaining reverse current flowing at the time of current cut-off.

For convenience of description, the front stage of the main breaker 11 is referred to as a first node 101, the rear stage of the main breaker 11 is referred to as a second node 102, and the rear stage of the load 19 is referred to as a third node 103.

The charging circuit line 20 is interposed between the rear stage of the main breaker 11 and the rear stage of the load 19, e.g., between the second node 102 and the third node 103. The first capacitor 21, the reactor 22 and the second diode 24 may be connected in series on the charging circuit line 20.

The first capacitor 21 is charged when a normal current flows. When a fault current occurs and the main breaker 11 is opened, the first capacitor 21 is discharged to produce a reverse current.

The reactor 22 is provided to stably maintain a circuit by limiting a rapid current change. The reactor 22 may be configured with a coil.

The second diode 24 is disposed to direct from the second node 102 to the third node 103. A second capacitor 23 may be further included in the charging circuit line 20. A first resistor 25 and a second resistor 26 may be connected in parallel to the first capacitor 21 and the second capacitor 23, respectively. Accordingly, charging voltages with which the first capacitor 21 and the second capacitor 23 are charged can be controlled. For example, assuming that a rating voltage of the main circuit line 10 is 100 kV and the first and second resistors 25 and 26 have their respective resistances of 40 kΩ and 10 kΩ, the first and second capacitors 21 and 23 respectively connected in parallel to the first and second resistors 25 and 26 are respectively charged with charging voltages of 80 kV and 20 kV according to a resistance ratio of the first and second resistors 25 and 26. That is, the charging voltages with which the first and second capacitors 21 and 23 can be controlled by controlling this resistance ratio. Primarily, the charging voltage of the first capacitor 21 can be controlled to meet a capacity required for current cut-off.

A switch line 30 is provided between the front stage (e.g., the first node 101) of the main breaker 11 and a node between the reactor 22 and the second capacitor 23 of the charging circuit 20. For convenience of description, the node between the reactor 22 and the second capacitor 23 is referred to as a fourth node 104.

A third diode 31 and a current switch 32 may be disposed in series on the switch line 30. The third diode 31 is disposed to direct from the first node 101 to the fourth node 104.

The current switch 32 may be configured with a mechanical switch or a power semiconductor switch which can be turned on/off. An example of the power semiconductor switch may include a thyristor, IGBT (Insulated Gate Bipolar Transistor), IGCT (Insulated Gate Controlled Thyristor), GTO (Gate Turn-Off Thyristor) or the like.

An auxiliary breaker 13 and a current limiting reactor 14 may be disposed in series on the main circuit line 10. The auxiliary breaker 13 is provided to remove a remaining current. The auxiliary breaker 13 may be a typical mechanical breaker.

The current limiting reactor 14 is provided to prevent mechanical and thermal hindrance of the circuit due to a short-circuit current and reduce a required capacity of the breaker by limiting a current to be cut off. The current limiting reactor 14 may be configured with an invariable inductance.

The operation of the direct current circuit breaker according to one embodiment of the present disclosure will be described below.

Figure 5:
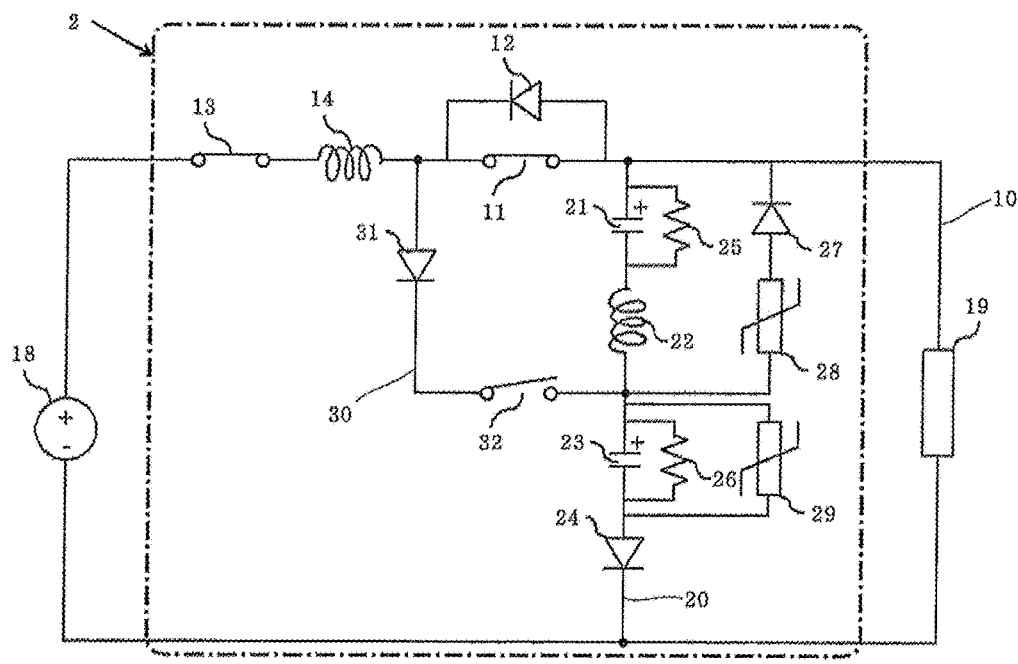
FIG. 5 is a circuit diagram of a direct current circuit breaker according to an embodiment of the present disclosure.

When the main breaker 11 and the auxiliary breaker 13 are closed (put in, closed circuit) and the current switch 32 is closed, a normal current flows along the main circuit line 10 (see an i1 circuit in FIG. 2). At this time, a current flows into the first and second capacitors 21 and 23 of the charging circuit line 20 while charging the first and second capacitors 21 and 23 ((see an i2 circuit in FIG. 2). At this time, as shown in FIG. 5, in the first and second capacitors 21 and 23, an anode is formed at the side of the second node 102 and a cathode is formed at the side of the third node 103. Here, as described above, the charging voltage of the first and second capacitors 21 and 23 can be controlled by the first and second resistors 25 and 26. When the first and second capacitors 21 and 23 are fully charged, no further current flows in the i2 circuit and a current of the main circuit line 10 flows into the i1 circuit including the load 19.

If a fault current occurs in the main circuit line 10, the fault current draws a smooth curve by the current limiting reactor 14 (see a fault current $I_{cal}$ in FIG. 3). When the fault current is detected by a detector (not shown) or the like, the main breaker 11 is opened. At this time, while the main breaker 11 secures a mechanical insulation distance, the fault current continues to flow through the main breaker 11 due to an arc.

Thereafter, when the main breaker 11 is opened until it reaches a threshold voltage (that is, when a predetermined time (several milliseconds) elapses), the current switch 32 is closed. When the current switch 32 is closed, a closed circuit i3 including a path of the first node 101→the fourth node 104→the second node 102→the first node 101 is formed. At this time, a charging current of the first capacitor 21 flows into the main breaker 11 in the reverse direction to the fault current, thereby extinguish an arc and hence blocking the fault current. That is, an arc current (fault current) flowing through the i1 path meets a reverse discharging current flowing through the i3 path, thereby producing a current zero point, which results in extinguishment of the arc of the main breaker 11. FIG. 3 shows the fault current $I_{cal}$ and a current waveform $I_{total}$ at the time of breaker operation. Since the first capacitor 21 has been already charged at the time of normal current conduction, a reverse current is immediately produced without requiring separate charging. On the other hand, a reverse current remaining after the arc extinguishment flows through the first diode 12.

When the fault current flowing through the main breaker 11 reaches the current zero point by the reverse current flowing through the i3 circuit, the remaining current flowing through the main circuit line 10 flows through an i4 circuit and an i5 circuit. Here, the i4 circuit is a circuit including a path of the power supply 18→the first node 101→the fourth node 104→the second node 102→the load 19→the third node 103→the power supply 18. The i5 circuit is a circuit including a path of the power supply 18→the first node 101→the fourth node 104→the third node 103→the power supply 18. At this time, the first and second capacitors 21 and 23 are charged. When the first and second capacitors 21 and 23 are fully charged, a current flowing through the i4 and i5 paths is automatically cut off.

Thereafter, the auxiliary breaker 13 is opened to cut off the remaining current and the direct current circuit breaker 1 is completely separated from the direct current system.

FIGS. 3 and 4 show examples of current and voltage waveforms obtained by simulating the cut-off operation of the direct current circuit breaker according to one embodiment of the present disclosure through a PSCAD/EMTDC program when a fault current occurs.

In FIG. 3, $I_{cal}$ represents a fault current waveform when the direct current circuit breaker does not work, $I_{total}$ represents a current waveform when the direct current circuit breaker works, and $E_{CB}$ represents a voltage waveform when the direct current circuit breaker works. In FIG. 4, $E_{CB}$ represents a voltage waveform when the direct current circuit breaker works, $I_{total}$ represents a current waveform when the direct current circuit breaker works, $I_{FS}$ represents a waveform of current flowing through the main breaker 11, and $I_{byp}$ represents a waveform of current flowing through the current switch 32.

If a fault current occurs at 0.0 ms while a rated current is flowing (before 0.0 ms) in a steady state, the fault current is smoothly increased by the current limiting reactor 14. In this analysis, since the direct current circuit breaker is set to operate at 2 kA, the main breaker 11 begins to be opened at about 0.5 ms according to an open operation signal of the main breaker 11. When the current switch 32 is closed at about 2.7 ms with lapse of a predetermined time after the open operation of the main breaker 11, a reverse current ($I_{byp}$ in FIG. 4) flows and an arc current ($I_{FS}$ in FIG. 4) flowing through the main breaker 11 meets the reverse current $I_{byp}$, thereby producing a current zero point to extinguish the arc current. Thereafter, the first and second capacitors 21 and 23 are fully charged at about 6.0 ms, thereby completing the cut-off operation of the direct current circuit breaker, as can be confirmed from FIG. 4.

FIG. 5 is a circuit diagram of a direct current circuit breaker 2 according to an embodiment of the present disclosure. In this embodiment, the direct current circuit breaker 2 further includes a diode and a nonlinear resistor in order to control the charging voltages of the first and second capacitors 21 and 23.

First, a fourth diode 27 and a first nonlinear resistor 28 may be disposed in series on a line connected in parallel to the front stage of the first capacitor 21 and the rear stage of the reactor 22. In addition, a second nonlinear resistor 29 may be connected in parallel to the second capacitor 23. In general, a nonlinear resistor has the characteristic that it passes a current when it reaches a certain voltage or higher. Therefore, if the first and second capacitors 21 and 23 are overcharged, a current flows through the first and second nonlinear resistors 28 and 29 connected in parallel, thereby preventing the first and second capacitors 21 and 23 from being overcharged.

Figure 6:
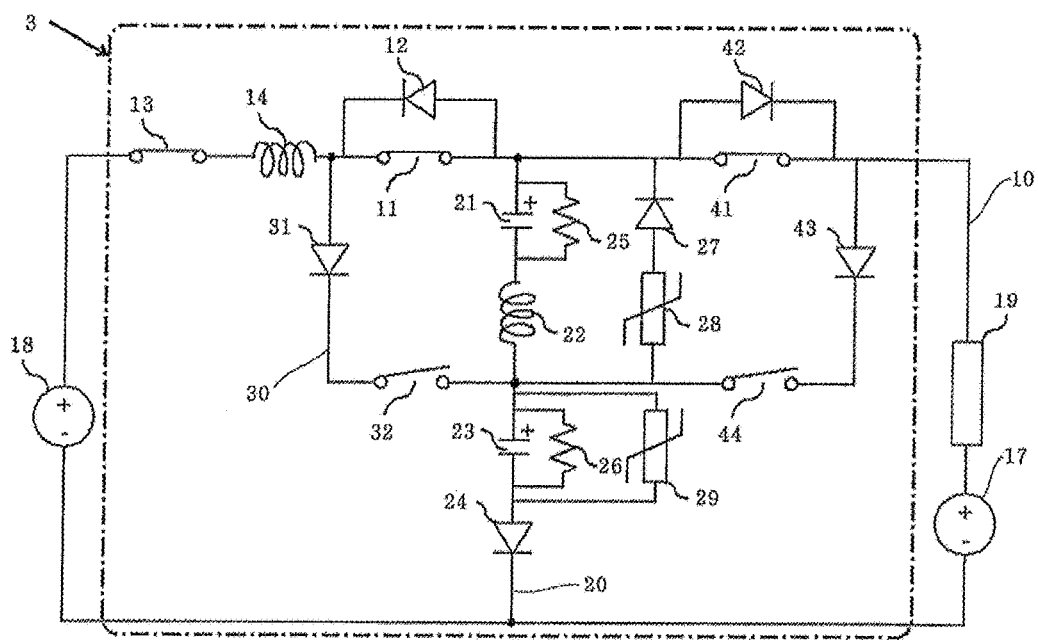
FIG. 6 is a circuit diagram of a direct current circuit breaker according to an embodiment of the present disclosure.

FIG. 6 is a circuit diagram of a direct current circuit breaker 3 according to an embodiment of the present disclosure. In this embodiment, the direct current circuit breaker 3 further includes a second main breaker 41, fifth and sixth diodes 42 and 43 and a second current breaker 44 in addition to the direct current circuit breaker of the earlier-described embodiments. Here, the second main breaker 41, the fifth and sixth diodes 42 and 43 and the second current breaker 44 are disposed in symmetry to the main breaker 11, the first and third diodes 12 and 31 and the current switch 32, respectively, with respect to the charging circuit line 20. In addition, a second power supply 17 is provided in the reverse direction to the power supply 18. This configuration allows a two-way current to be cut off.

With the direct current circuit breakers according to the above-described embodiments of the present disclosure, since the first capacitor is already charged in the steady state, it is possible to immediately produce a reverse current at the time of cut-off operation. In other words, conventional reverse charging is unnecessary. This makes it possible to shorten a time taken for the cut-off operation and cut off a circuit to cope with a smaller fault current. Accordingly, it is possible to employ a small capacity mechanical breaker and capacitor with low cut-off performance required, which can result in reduction of production costs.

According to some embodiments of the present disclosure as described above, since the first capacitor is already charged in the steady state, it is possible to immediately produce a reverse current at the time of cut-off operation. This makes it possible to shorten a time taken for the cut-off operation and cut off a circuit to cope with a smaller fault current. Accordingly, it is possible to employ a small capacity mechanical breaker and capacitor with low cut-off performance required, which can result in reduction of production costs.

While some embodiments of the present disclosure has been particularly shown and described with reference to embodiments thereof, it will be understood by those skilled in the art that various changes in form and details may be made therein without departing from the spirit and scope of some embodiments of the present disclosure. The embodiments are provided for the purpose of illustrating some embodiments of the disclosure, not in a limitative sense. Thus, it is intended that some embodiments of the present disclosure covers the modifications and variations of the embodiments of this disclosure provided they come within the scope of the appended claims and their equivalents.

What is claimed is:

1. A direct current circuit breaker comprising:
   a main circuit line configured to be connected between a power supply and a load, wherein the main circuit line includes a main breaker and a first diode connected in parallel;
   a charging circuit line which is disposed in a rear stage of the main breaker and configured to be connected in parallel to the load, wherein the charging circuit line includes a first capacitor, a reactor and a second diode connected in series; and
   a switch line including a first end connected in parallel to a front stage of the main breaker and a second end connected between the reactor and the second diode, wherein the switch line includes a third diode and a current switch connected in series,
   wherein the charging circuit line further includes a second capacitor connected between the reactor and the second diode.

2. The direct current circuit breaker according to claim 1, wherein the main circuit line further includes an auxiliary breaker and a current limiting reactor connected in series.

3. The direct current circuit breaker according to claim 1, further comprising a first resistor and a second resistor connected in parallel to the first capacitor and the second capacitor, respectively, wherein the first resistor and the second resistor are used to control charging capacities of the first capacitor and the second capacitor.

4. The direct current circuit breaker according to claim 1, wherein the main breaker is a mechanical switch or a high-speed switch.

5. The direct current circuit breaker according to claim 1, wherein the current switch is a mechanical switch or a power semiconductor switch.

6. The direct current circuit breaker according to claim 1, further comprising a circuit connected in parallel to a front stage of the first capacitor and a rear stage of the reactor, wherein the circuit includes a fourth diode and a first nonlinear resistor connected in series.

7. The direct current circuit breaker according to claim 1, wherein a second nonlinear resistor is connected in parallel to the second capacitor.

8. The direct current circuit breaker according to claim 1, wherein a second main breaker, a fifth diode, a sixth diode and a second current breaker are disposed in symmetry to the main breaker, the first diode, the third diode and the current switch, respectively, with respect to the charging circuit line.

* * * * *